July 2, 1935.  G. CLAUDE ET AL  2,006,985
METHOD AND APPARATUS FOR OBTAINING POWER FROM SEA WATER
Filed June 17, 1932  4 Sheets-Sheet 3

INVENTORS
GEORGES CLAUDE
PAUL BOUCHEROT
ATTORNEYS

Patented July 2, 1935

2,006,985

UNITED STATES PATENT OFFICE 2,006,985

METHOD AND APPARATUS FOR OBTAINING POWER FROM SEA WATER

Georges Claude and Paul Boucherot, Paris, France

Application June 17, 1932, Serial No. 617,908
In France March 13, 1926

12 Claims. (Cl. 122—40)

This invention relates to method and apparatus whereby we have succeeded in obtaining power from the difference in temperature between the surface water of tropical seas and the water at great depths. This application contains matter derived from our earlier applications Serial Number 174,616, filed March 11, 1927 and Serial Number 225,406, filed Oct. 7, 1927. In the tropics, it is quite customary to find sea water having a temperature ranging as high as from 25° to 27° C. This water is, of course, found at the surface and as one goes down the water becomes colder so that if one goes to a depth of approximately a kilometer, water can be found having a temperature in the order of 5° C. With these differences in temperature available in relatively close proximity to each other, we have at hand a temperature head of great importance as a source of energy, particularly when we remember that the quantities of water available are practically limitless. This is not a purely theoretical source of energy which is unavailable because found in nature in a state of equilibrium. Actually, it is the temperature differences between the bottom water and the surface water which are the motivating forces for the great ocean currents. Thus the waters of the Gulf Stream are heated in the Caribbean Sea, and as they become warmer they are continually being displaced by the cold water which has followed the ocean bottom down from the melting ice of the North Polar cap. The displaced warm waters sweep north and east in a mighty stream, carrying warmth to England and northern Europe. Our problem is to convert a small fraction of this tremendous energy into a form where it may be directly usable.

While the cold water is found only at a great depth below the heated surface, this does not mean that a vast amount of energy must be used in raising the water from this depth, for if a large conduit is sunk into the sea so that its bottom end extends into the cold zone and the water is then pumped out from the top, it follows as a matter of course from the law of connecting vessels, that the cold water must rise in the conduit, so that when the warm water has once been pumped out, cold water will be available practically at sea level. It is true that the cold water in the conduit will have a slightly greater density than the warmer waters so that the cold water available in the conduit will be slightly below sea level; also as the cold water is removed for use, causing a flow, there will be some friction against the sides of the conduit. However, we have found by actual experience that if the conduit is made sufficiently large it is possible to pump out the cold water at a sufficiently rapid rate so that it will not materially heat up during its flow and still have the surface level of the cold water in the conduit less than three meters below the adjacent sea level. Thus the amount of energy needed to obtain the cold water is very slight.

In considering the utilization of the heat differential available we thought of the possibility of utilizing the warm water for vaporizing, and the cold water for condensing, some selected material which would have a boiling point between the temperatures of these two masses of water. We decided, however, that this was totally impracticable both because of the possibility of losses of the material used and principally because the temperature differential would be so low that practical heat transfer would be impossible. Accordingly, we decided to utilize steam obtained directly from the warm water by the use of low pressures, and condensation by direct contact with cold water.

In order to demonstrate the fact that energy is practically available from masses of water of different temperature, water at a temperature of about 27° C. was put in one vessel and cracked ice was put in another vessel. The two were connected with a turbine interposed between them. When all connections had been made tight, the air was pumped out of the system. Immediately the dynamo started to revolve due to the generation of steam on the hot water side and its condensation by the ice. For about two hours a very considerable amount of power was developed, but gradually this began to fall off. An examination showed that the ice had not all melted, so the condenser was still working efficiently, but the temperature of the water at the hot end had dropped due to the fact that the mass of water had been forced to give up heat units to permit a portion of this water to vaporize.

It must be borne in mind that in all steam generators heretofore used, heat is applied from the outside both to raise the water to the boiling point and to supply the heat of vaporization, so that water is introduced into the boiler only to replace that which is evaporated. In our case, we are not supplying any heat from the outside and instead of raising the temperature of the water in the steam generator this temperature actually drops by the absorption of heat units in the course of vaporization. It is thus clear that all of the heat must be drawn from the water itself;

in other words, as a part of the water is vaporized due to the very low pressure in the steam generator, it must draw heat units from the water remaining in the liquid phase, and therefore the temperature of this remainder will drop. In order thus to use the heat of the water itself, relatively large amounts of water must be supplied to the steam generator of which only a small part will be converted into steam, with the balance serving as a source of heat and remaining in liquid form. Once this residue has dropped in temperature, its usefulness is ended and it must be withdrawn from the system. Our success has depended entirely upon the application of this principle, though of course many problems had to be solved before the final accomplishment was carried through successfully.

Quite naturally, if one is seeking to obtain steam from water at a temperature in the order of 25° to 27° C. very low pressures must be maintained and the large excess of water which has given up heat units in the form of steam must be withdrawn from the generator against atmospheric pressure. At first glance this suggests a point where energy must be consumed, but this can be accomplished substantially without expenditure of energy by using the principle of the barometric tube.

We have found that by positioning the bottom of the steam generator a distance above the sea level slightly greater than the height to which the difference in pressure between atmospheric and the pressure in the generator will raise a column of water, and then connecting the bottom of the generator with the sea by a discharge pipe whose lower end is submerged, any water reaching the bottom of the generator will enter this discharge pipe and push out a corresponding amount of water at the bottom, so that the level of the water in this discharge pipe will remain slightly below the level of the bottom of the generator without any change of pressure occurring in the generator. We have also found that the hot water to be introduced into the generator can be brought in at a point only a short distance above the outlet level (say a meter or less) and when the vacuum has been established in the generator the atmospheric pressure will be sufficient in itself to lift the hot water at least as high as the exhaust water so that the only energy that need be expended in supplying hot water to the system is enough to lift the hot water the additional short distance by which the introduction point is above the water level in the exhaust pipe. If preferred, the generator may be positioned a little lower so that the hot water will be injected into the generator by atmospheric pressure, but in this case the exhaust water must be pumped down instead of the hot water being pumped up. Also the whole system may be raised even higher above sea level, in which case a greater amount of energy must be expended in pumping up the water but a part of this can be recovered by the use of turbines positioned in the exhaust pipes.

On the condenser side a similar plan is followed of exhausting the used water down through a barometric tube and elevating the fresh cold water to a slightly higher level. In this case the barometric column of the exhaust water will be slightly higher than on the generator side due to the fact that there will be lower pressure in the condensing chamber, and also there is a somewhat greater differential between the barometric level to which the cold water will rise and the injection point, due to the fact, as already brought out, that the cold water in the submarine conduit will not rise quite to sea level when under the influence of atmospheric pressure. Based on actual experience, we have found, as already stated, that this increment does not amount to over 3 meters.

From the foregoing it is seen that the energy that must be expended to operate the system designed in accordance with our invention is that necessary to lift the hot water a very short distance (not over about 2 meters) and that necessary to lift the cold water a somewhat greater distance (but not over about 6 meters) plus a small expenditure for pumping out air released from the water by the low pressures employed. We have developed special means for carrying out the step last referred to and are able to keep this energy consumption very low. Against these expenditures we have usable energy which we have found to be very great. Thus actual experience has shown that a temperature differential of 20° C. is equivalent in net power yield to that of a hydraulic head of as much as 95 meters with a flow equal to that of the cold water actually used in our operation.

For the purposes of illustration, we show in the accompanying drawings diagrammatic representations from which the principles discussed can readily be understood, and also show a practical structure which we have utilized in demonstrating our invention. In these drawings.

Figure 1:
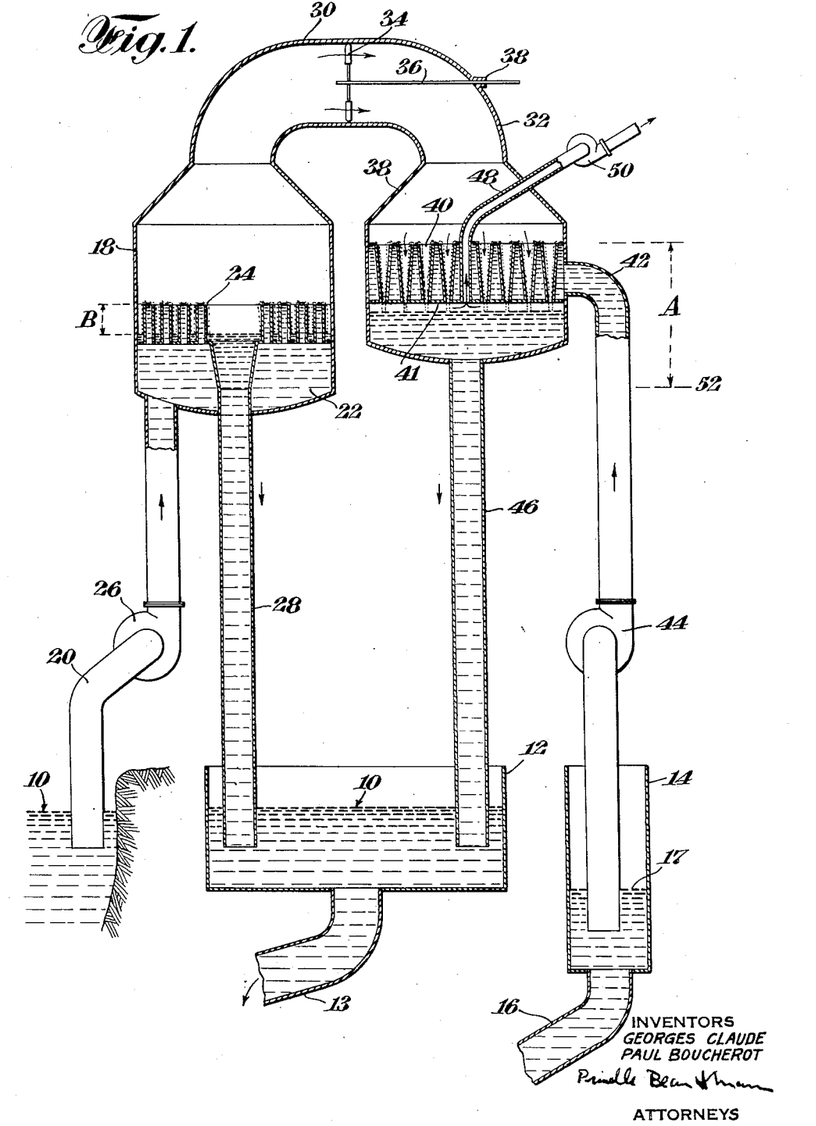
Fig. 1 is a diagrammatic sectional view illustrating the use of the barometric columns and the various water levels that will be employed.

Referring now to Fig. 1, the numeral 10 designates the level of the sea from which the hot water is to be withdrawn. This same level maintains in the tank 12 into which the used water discharges. The tank 12 has an open connection with the sea through the pipe 13 which serves to conduct the used water to a point remote from the intake so that the temperature of the intake water will not be lowered. 14 is a tank at the upper end of the conduit 16 which it is to be understood runs to a great depth and may, for example, be built as shown in our co-pending application Serial Number 229,357, filed Oct. 28, 1927. When water is being pumped from the tank 14 its level will fall somewhat below the normal sea level 10 due to friction and the increased density of the cold water. This level is here designated by the numeral 17 and the results of our actual demonstrations have shown that with a somewhat insulated conduit in the order of 5 meters in diameter and a rate of flow through the conduit in the order of 1 meter per second, the difference between level 10 and level 17 will be less than 3 meters and there will be very little heating of the water during its rise through the conduit.

The chamber 18 which here serves as the steam generator is positioned above the level 10 a sufficient distance, so that if complete vacuum were obtained in this chamber, the sea water would rise in the pipe 20 and enter the hot water supply basin 22 but would not quite reach the overflow pipes or jets 24. The pipe 20 is provided with a pump 26. The down pipe 28 discharges the used water from tank 18 into tank 12. If perfect vacuum were maintained in chamber 18, it is obvious that the only work that pump 26 must do in order to cause a circulation through this part of the system is to lift the water the very short distance by which the top of jets 24 are above the level to which the water will be lifted by atmospheric pressure.

Connected with chamber 18 by conduit 30 is condenser chamber 32 and positioned in conduit 30 is a turbine 34 mounted on a shaft 36 which passes out through a stuffing box indicated at 38.

Condenser chamber 32 is provided with a series of overflow pipes 40, which are here shown as tapered with their small ends at the bottom mounted in a plate 41. These pipes 40 are surrounded by cold water which is introduced above plate 41 by pipe 42 and is drawn from the tank 14 with the assistance of pump 44. The cold water level is maintained high enough so the cold water will flow in a thin film down the inside of these pipes 40, contacting with the vapor to be condensed, and then pass to the bottom of the condenser chamber and down through pipe 46 to tank 12. As shown, the bottom of plate 41 is just above the level to which water will be held in pipe 46 by atmospheric pressure when vacuum is maintained in chamber 32. A pipe 48 connected to the space below the plate 41 draws off gases and uncondensed vapor and permits the proper degree of vacuum to be formed and maintained by a vacuum pump 50.

When the apparatus is to be put into operation, water is pumped out of tank 14 by any desired means until the water entering it through conduit 16 becomes cold, say, at a temperature of 5 to 7° C. Vacuum pump 50 is now started and when the pressure in connecting chambers 18 and 22 has dropped to about 0.01 atmospheres, water will rise in both pipes 20 and 28 to a point just below the level of the top of pipes 24. In the same way water will rise in pipe 46 to a point just below the bottom of pipes 40 and cold water will rise in pipe 42 to the approximate level indicated by the broken line 52. Pump 44 is now started and by exerting sufficient energy to lift the cold water from level 52 to above the top of pipes 40 (here indicated by the dimension A, which ordinarily will be less than 4 meters) water will start to trickle or flow down around the inside of pipes 40 and thence down through pipe 46. When this flow is properly adjusted, pump 26 is started, and with an expenditure of almost no energy at all, the flow of warm sea water is started out of pipes 24.

As the warm water flows out of pipes 24 and down around the sides of these pipes, this water will boil violently giving off steam but dropping in temperature until an approximate equilibrium is reached between the temperature of the residual water and the pressure in the chamber. This residual water which has given up heat units to the vaporized portion and therefore has served its useful purpose, will flow down through pipe 28 and ultimately will be conducted back to the sea at an appropriate point. The temperature of this water will be found to be about 3° to 5° C.

below the temperature of the surface sea water.

The vapor formed will somewhat raise the pressure in chamber 18, say to about .03 atmospheres, permitting the top level of the excess water to drop slightly and increasing to a very limited extent the work which pump 26 must do. The total lift which pump 26 must give the warm water is here indicated as dimension B which ordinarily is much less than one meter. Since the pressure in chamber 18 is increased, and there is no corresponding increase in chamber 32, the steam will rush from chamber 18 through conduit 30 driving turbine 34. In chamber 32 the steam will be condensed by the cold water in pipes 40 so that a pressure differential will be maintained between the two chambers and turbine 34 will operate continuously. From this it is clear that the energy consumed during operations is only that necessary to raise the hot water less than 1 meter and to raise the cold water less than 4 meters and to pump out the uncondensed vapors and released gases by vacuum pump 50. This energy expenditure is only a small fraction of the energy delivered by the turbine.

Prior to the demonstration of the practicability of our invention at our experimental station in Cuba, it was frequently prophesied that our plan would fail because of the energy necessary to remove all released gases and so maintain the necessary vacuum in the system. We found, however, that since these gases were released progressively as the pressure is lowered, it is possible to remove the gases in stages as the water rises in the barometric tubes, and obviously very much less energy is necessary to remove the bulk of the gases at pressures as high at 0.2 atmospheres than would be necessary to remove these gases at the very low pressure in the order of 0.01 atmospheres that is maintained in the condenser.

Another point where efficiency can be increased is by shortening or doing away entirely with the steam lines connecting the turbine with the generating and condensing chambers. Due to the relatively low pressure differential between the condensing and generating chambers, it is feasible to have these two chambers both in one enclosure with the turbines positioned directly between them, and if desired the generating chamber may be divided into two or more zones so that the turbines may be operated in stages.

The speed of the turbines may be regulated by the rate of flow of either the hot or cold water, or by control of the degasifying pumps or the turbine may be connected with a governor which will operate a valve to admit air into the system and thereby control the generation of steam.

Figure 2:
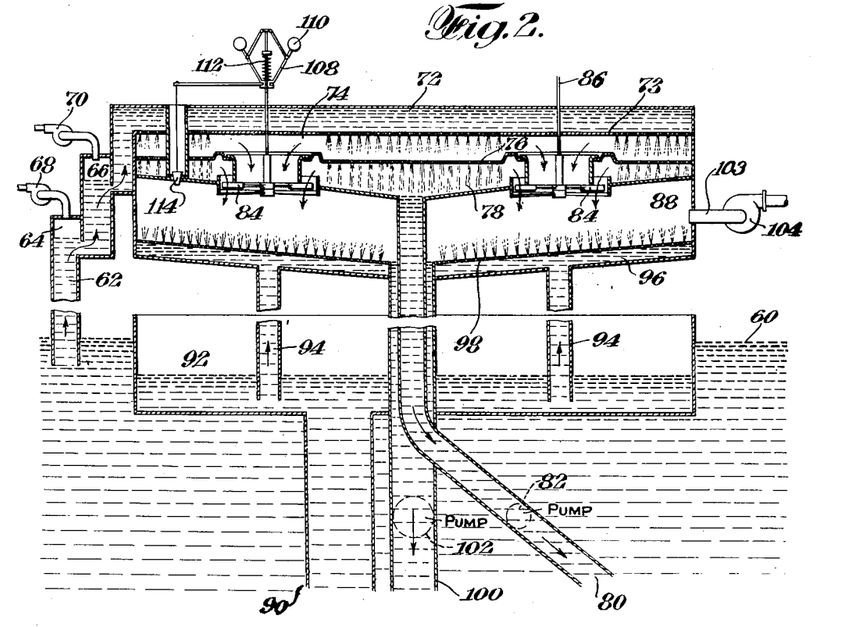
Fig. 2 is a diagrammatic sectional view illustrating certain devices which we have found of value in increasing the efficiency of the device.

These features are illustrated diagrammatically in Fig. 2. The device shown in this structure is intended to be positioned above the sea level, indicated by the numeral 60, only such a distance that both the hot and cold water will be injected by atmospheric pressure and the exhaust water is removed by pumps. The hot water rises from the sea level through the pipes 62 which may be provided with the two traps 64 and 66, each of which will collect gases that have been released from the liquid by the fall in pressure during its rise. These gases are pumped out from the traps by the vacuum pumps 68 and 70. After passing trap 66 the hot water enters a chamber 72 which has a bottom 73 formed with fine perforations so that the water sprays down in droplets through the primary generating chamber 74 onto a second perforated plate 76. Again, the hot water passes through the perforations in this plate, and is sprayed through the secondary generating chamber 78 and is collected on the bottom of this chamber and passes downward through the pipe 80 provided with a suction pump 82. It is to be understood that due to the fact that the pressure in the chambers 74 and 78 is very low, the water falling through these chambers will be partially vaporized.

Turbines 84 are mounted on shafts 86 and are so positioned that these turbines are operated in two stages from the steam generated in the chambers 74 and 78. After passing through the turbines 84 the steam enters condensing chamber 88 where it is condensed by sprays of cold water. This cold water has been drawn from the depths through conduit 90 into a tank 92 open to air pressure. From the tank 92 the cold water has been forced upward by atmospheric pressure through pipes 94 into a cold water supply chamber 96, and from cold water supply chamber 96 through the perforated plate 98 into the condensing chamber 88. The condensing water together with the condensed vapors are drawn downward through pipe 100 through the action of a pump 102. It is to be understood that the pipes 94 may be provided with traps and vacuum pumps corresponding to the traps 64 and 66 and the vacuum pumps 68 and 70, though such additional traps and pumps are not here shown. In addition, a pipe 103 provided with a vacuum pump 104 connects with condensing chamber 88 to remove any small amounts of released gas that have not been taken out at the points previously designated.

For the purposes of illustration, we show one of the shafts 86 provided with a governor 108. This is of the usual type provided with weights 110 at work against a spring 112. If the weights fly out too far due to too great an increase in speed a valve 114 is opened slightly admitting a small amount of air into the condensing chamber 88 and thereby reducing the steam flow.

In Figs. 3, 4, 5, 6 and 7 we show an embodiment of our invention which has been put into actual operation as a demonstrating device. In these figures, the sea level is designated by the numeral 120. The hot water is brought up from the surface through pipe 122 provided with centrifugal pump 124. When the water reaches the top of pipe 122, it enters chamber 126 provided with a dished bottom 128. The side walls of chamber 126 are indicated at 130. Positioned inside chamber 126 is a vessel 132 the side walls of which end a little below the side walls 130. Attached to plate 135 which covers the outer portion of chamber 126 is a ring member 134, which, co-operating with the upper edge of the side-wall of vessel 132, forms a restricted opening in the form of a downwardly jointing annular jet through which the water passes into vessel 132 with considerable velocity, in the form of a thin cylindrical sheet.

In vessel 132 the water passes down around the outside of baffle 136, then up over the top of baffle 138 and finally up through ring 140 into chamber 142. It is to be noted that the ring 140 is tightly connected to cover plate 135 so that an air trap or space is provided through which the cylindrical sheet of incoming water falls. The impact of this falling water as well as the fact that the water must rise or fall several times in passing the various baffles sets up eddies and whirls which stimulate the release of gas from the water, so that the greatest part of the air separates from the water in the form of relatively large bubbles. In order to remove the air which has thus been released, a connection for primary gas removal is made to the cover plate 135 as indicated by the pipe 144. This pipe is connected with a vacuum pump indicated at 146 (see Fig. 3) which is ordinarily so run as to maintain an absolute pressure of about one-tenth of an atmosphere in the space under cover plate 135. The secondary gas removal is provided by a pipe 148 connected with vacuum pump 150 and also connected to the top of vessel 142, which exhausts further air at a pressure of about .06 atmospheres.

Figures 3, 6:
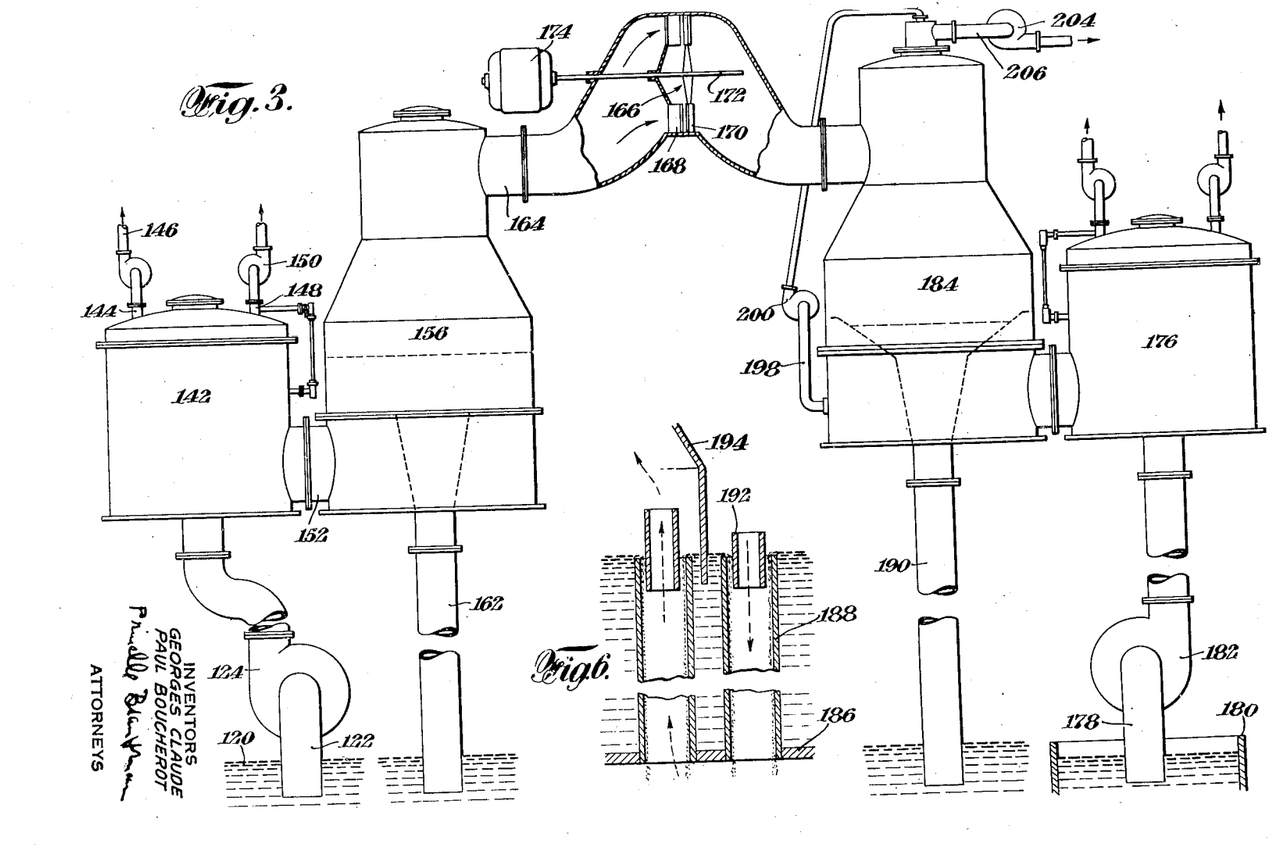
Fig. 3 is a side view with parts broken away showing the arrangement of the apparatus used by us in certain demonstrations heretofore carried out.
Fig. 6 is a detailed sectional view showing the condenser tubes of the apparatus illustrated in Fig. 5.
Figure 4:
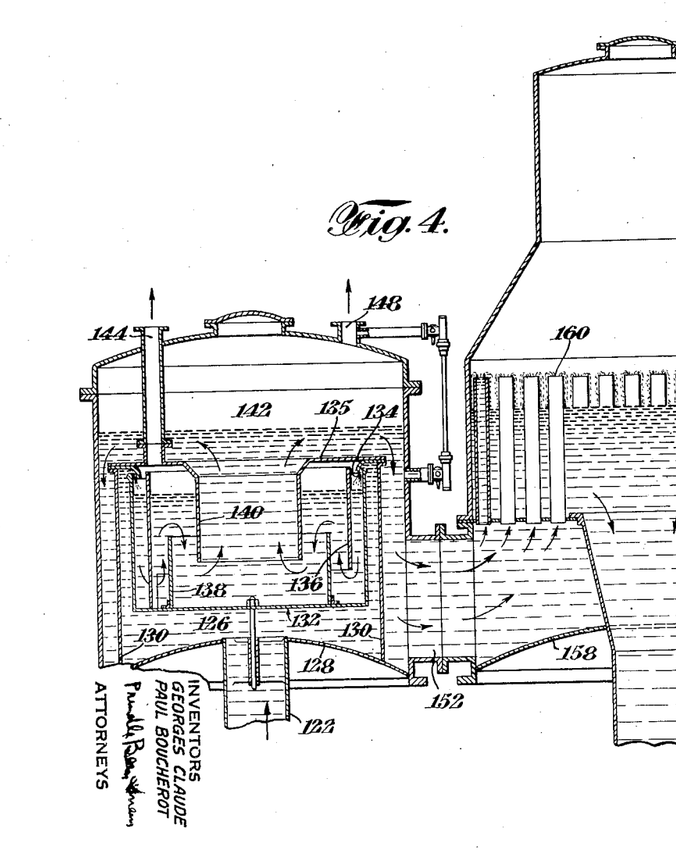
Fig. 4 is a sectional view of the same generator illustrated in Fig. 3.

Water which has come into vessel 142 through pipe 140 passes downwardly around the outer part of this vessel and then out through the connection 152 into the steam generator 156.

The steam generator 156 has a dished bottom 158 above which are a number of vertical jets 160 the tops of which are above the level to which sea water can be raised by atmospheric pressure. These jets are carried by a plate 161. The hot water rising in pipes 160 flows down over the sides of these pipes and due to the very low pressure maintained in the upper portion of the steam generator, this water boils, giving off vapor which acquires its heat of vaporization from the residual water. It is to be understood that only a small proportion of the water will be thus volatilized, so that the solids carried by the water will not be crystallized out. The excess water flows down through pipe 162, the lower end of which is submerged at sea level, but preferably the discharge is made at a point remote from the intake of pipe 122. The water level in pipe 162 will remain substantially constant and if we disregarded the small losses due to friction, the hot water which comes up through pipe 122 will rise to the same level in pipes 160 as that maintained by the discharge water which passes out through pipe 162. It is obvious that pump 124 will only have to do enough work to overcome the frictional flow of the hot water and lift it the short distance by which the tops of pipes 160 are above the constant water level of the used water which is to pass out to pipe 162. The power thus consumed will be almost insignificant and due to the fact that the bulk of the gas has been removed through pipe 144, at a pressure above the minimum, the energy consumed by the vacuum pumps 146 and 150 will also be very small in quantity.

The vapor or steam generated by the hot water flowing out of pipes 160 passes up through pipe 164 and through a turbine indicated at 166 which is made up of the distributor 168 and turbine blades 170. The turbine blades 170 are attached to a shaft 172 which passes out of the system and is here shown as connected directly to a dynamo indicated at 174.

Figure 5:
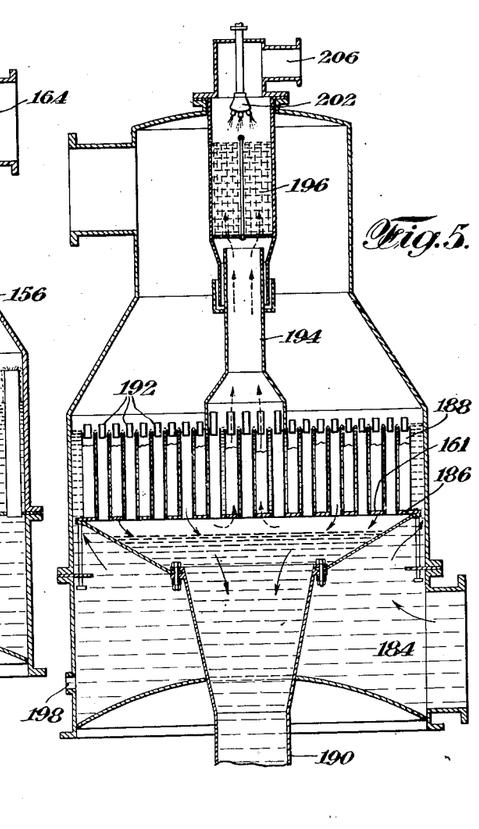
Fig. 5 is a sectional view of the condenser.

The condenser side is here shown as having a degasifier 176 for the cold water similar to that which has been described in detail for the hot water. The cold water is supplied to this degasifier through a pipe 178 the lower end of which enters a tank 180 the surface of which is open to the atmosphere and which is supplied with cold water through a conduit reaching to great depths as has already been described. The water is forced upwardly through pipe 178 partly by atmospheric pressure and partly by the pump 182.

Figure 7:
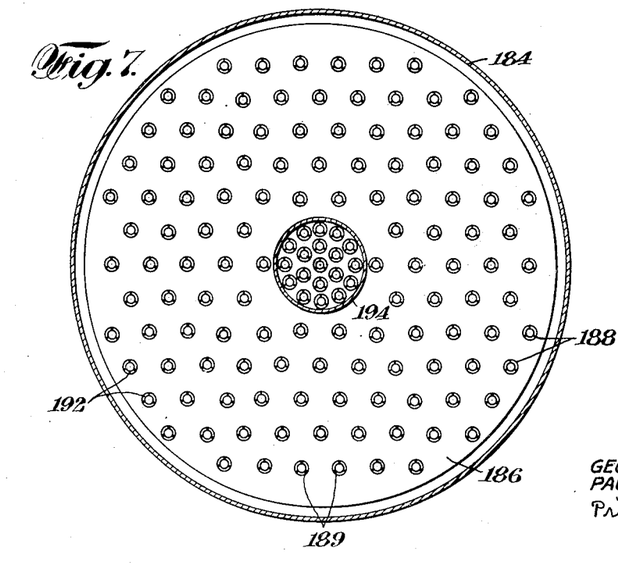
Fig. 7 is a plan view of these tubes, with portions of the casing shown in section.
Figure 8:
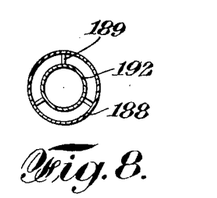
Fig. 8 is a detailed sectional view showing the arrangement of the vent pipes in the condenser tubes.

The cold water from degasifier 176 passes into the lower portion 184 of the condenser and then rises up around the periphery of a plate 186 supported in the condenser apparatus. The plate 186 carries a large number of vertical tubes 188. It is also to be noted that the plate 186 is slightly above the level to which water is raised by atmospheric pressure in the discharge pipe 190 which, like the discharge pipe 162, has its lower end submerged at the sea level. Pump 182 is operated with sufficient force to raise the level of the cold water slightly above the tops of tubes 188 so that the cold water will trickle down the insides of these tubes passing to the discharge pipe 190. It is the intention that the vapor to be condensed shall also pass down these tubes and in order to eliminate the necessity of great accuracy as regards the water level in the condenser each tube 188 is provided with an inlet nozzle or weir 192 which will extend above the water level with a slight clearance between the outside of the nozzle 192 and the inside of the tube 188. These weirs or nozzles may be supported in the tubes 188 by spiders 189 as indicated in Fig. 7.

The vapor which has passed through turbine 166 flows to the condenser and down through nozzles 192 and tubes 188 where it meets the cold water and is largely condensed. In this case, in order to provide a secondary condenser apparatus the residual vapor was passed upwardly through a tube 194 to a secondary condenser comprising a large number of gauze baffle plates 196 on which an additional small amount of cold water was sprayed. This cold water was drawn from the lower portion of condenser 184 by a pipe 198 supplied with a small pump 200 and the spray by which the water was supplied to the condenser is indicated at 202. Any residual gas that had not been thus condensed was withdrawn by vacuum pump 204, through pipe 206.

We have carefully calculated the varying factors which would enter into the power yield from a large installation, following in general the foregoing disclosure. This is based on the use of a cold water conduit of 10 meters in diameter, in which the water would move at a rate of flow approximately 1 meter per second, and is further based on the calculation that the naturally heated surface water available has a temperature of 29° C. and that the naturally cold water brought up from the bottom of the ocean has a temperature of 5° C. These figures are based on a design using eight turbines arranged in parallel but in general following the detailed disclosure given above.

*Production of vapor*

| | |
|---|---|
| Temperature of the warm water entering the vaporizers_____degrees__ | 29 |
| Temperature of the warm water leaving the vaporizers_____degrees__ | 26 |
| Loss in temperature during vaporization_____degrees__ | 3 |
| Absolute pressure of vapor produced kg. per sq. cm__ | .034 |
| Rate of flow of warm water entering the vaporizers_____cu. meters per set__ | 140 |
| Rate of production of vapor kg. per second__ | 710 |
| Percentage of warm water vaporized per cent__ | .5 |

*Utilization of vapor in the turbines*

| | |
|---|---|
| Temperature of the vapor at the intake of the turbines_____degrees__ | 26 |
| Temperature of the vapor at discharge from the turbines_____ | 13.5 |
| Absolute pressure of the vapor at the intake of the turbines__kg. per sq. cm.__ | .034 |
| Absolute pressure of the vapor at the discharge of the turbines__kg. per cm.__ | .0156 |
| Rate of speed of the vapor at the discharge of the turbine distributors meters per sec__ | 445 |
| Heat transformed into work per kg. vapor calculated on basis of no power loss in transmission_____calories__ | 26 |
| Power available at the shaft of the turbines_____kw__ | 52,000 |
| Power available at the generators___kw__ | 50,000 |
| Consumption of vapor by the turbines kg. per sec__ | 710 |
| Hourly consumption of vapor per kw. at the generators_____kg__ | 51 |

*Condensation of vapor*

| | |
|---|---|
| Temperature of the cold water entering the condensers_____degrees__ | 5 |
| Temperature of the water leaving the condensers_____degrees__ | 10.5 |
| Absolute pressures in the condensers kg. per sq. cm__ | .0156 |
| Rate of flow of cold water entering the condensers_____cu. meters per sec__ | 75 |

*Extraction of air from the degasifiers and the condenser*

| | |
|---|---|
| Temperature of the mixture of air and vapor withdrawn from the condensers degrees__ | 6 |
| Absolute pressure of the mixture of air and vapor withdrawn from the condensers kg. per sq. cm__ | .0156 |
| Rate of flow of the mixture of air and vapor extracted from the condensers cu. meters per sec__ | 145 |
| Power to extract air and vapor mixture from condensers_____kw__ | 1000 |
| Temperature of the air and vapor mixture extracted from the warm water degasifiers_____degrees__ | 29 |
| Absolute pressure of the air and vapor mixture extracted from the warm water degasifiers_____kg. per sq. cm__ | .088 |
| Rate of flow of the mixture of air and vapor exhausted from the warm water degasifiers_____meters per second__ | 30 |
| Power necessary to exhaust air and vapor mixture from the warm water degasifiers kw__ | 800 |
| Temperature of the air and vapor mixture exhausted from the cold water degasifiers degrees__ | 5 |
| Absolute pressure of the air and vapor mixture exhausted from the degasifiers of the cold water_____kg. per sq. cm__ | .088 |
| Rate of flow of the air and vapor mixture from the cold water degasifiers cu. meters per sec__ | 10 |
| Power necessary to exhaust the air and vapor mixture from the cold water degasifiers_____kw__ | 450 |

*Raising the hot and cold water*

| | |
|---|---|
| Average height of raising cold water meters__ | 5.75 |
| Rate of flow of cold water cu. meters per sec__ | 75 |
| Power necessary for cold water pumps kw__ | 5450 |
| Average height of raising warm water meters__ | 1.35 |

Rate of flow of warm water
cu. meters per sec__ 140
Power necessary for warm water pumps
kw__ 2600

*Power developed*

|   | Kilowatts |
|---|---|
| 1. Power developed by generators | 50,000 |
| 2. Power absorbed: | |
| (a) Exhausting air from condensers | 1000 |
| (b) Exhausting air from warm water degasifiers | 800 |
| (c) Exhausting air from cold water degasifiers | 450 |
| (d) Raising the cold water | 5450 |
| (e) Raising the warm water | 2600 |
|   | 10,250 |

3. Net power available___50,000−10,250=39,750

4. Percentage of power absorbed by auxiliaries______ $\frac{10{,}250}{50{,}000}=20.5\%$

What we claim is:

1. In the art of obtaining power from the difference in temperature between naturally heated surface sea water and cold water from great depths, the method which comprises continuously elevating naturally heated sea water a substantial distance in a tube while maintaining the water at the lower end of the tube substantially at atmospheric pressure and the water at the upper end at a pressure low enough to cause such water to boil, breaking up the water while under such reduced pressure to give an extended surface whereby a substantial amount of such water is vaporized with a withdrawal of heat units from the balance of the water, returning the residual water to atmospheric pressure with the aid of gravity and withdrawing the vapor thus generated by the condensing action of cold sea water from great depths.

2. A method as specified in claim 1 which further includes the steps of entrapping gas released from the water and removing it while at a pressure substantially below atmospheric but substantially above the pressure at which the water is vaporized.

3. A method as specified in claim 1, which further includes the steps of entrapping gas released from the water and removing it at successive stages of reduced pressure which are substantially below atmospheric but above the pressure at which the water is vaporized.

4. The process of obtaining power from the difference in temperature between naturally heated surface sea water and cold water from great depths, which comprises the steps of forcing upward out of contact with the air a column of naturally heated sea water, whereby the pressure on such water is progressively reduced, trapping and removing air released from such water, and thereafter disseminating such water in a chamber in which the pressure is sufficiently low to cause an ebullition of the water to take place without the necessity of raising its temperature, whereby water vapor is formed, removing unvaporized water, and causing the water vapor to move out of such chamber by the condensing action of cold water.

5. The process of obtaining power from the difference in temperature between naturally heated surface sea water and cold water from great depths, which comprises the steps of bringing naturally heated sea water into a chamber in which the pressure is below the vapor tension of such water whereby a portion of such water is vaporized, supplying heat to the chamber by substantial excesses of such hot water over and above the amount evaporated so that the water vapor pressure in the chamber will approach very closely to the vapor tension of water at the temperature of the water introduced into such chamber, and causing water vapor to move out of such chamber and deliver power during such movement by the condensing action of cold sea water from great depths.

6. An apparatus for generating power from the difference in temperature between naturally heated surface sea water and cold water from great depths, comprising a chamber located a substantial distance above a body of such surface water, an inlet pipe leading to such chamber from under the surface of such water, means for withdrawing air from such chamber, a discharge pipe leading from such chamber back into the body of water, means for causing water to circulate in such system whereby a portion thereof may be vaporized in such chamber without admitting air directly into the system and means for causing water vapor to move out of said chamber such latter means comprising a condenser adapted to be operated by relatively cold water and means for supplying cold water from great depths of the sea to such condenser.

7. An apparatus for obtaining power from the difference in temperature between naturally heated surface sea water and cold water from great depths, comprising a chamber located a substantial distance above a body of such surface water, means for reducing the pressure in such chamber, an inlet pipe leading from under the surface of such water to such chamber, means for withdrawing air released from water in such pipe before the water reaches such chamber, a discharge pipe leading back from such chamber into a body of water, and means for causing water vapor to move out of said chamber such latter means comprising a condenser operated by relatively cold water obtained from the ocean depths.

8. In an apparatus for obtaining power from the difference in temperature between naturally heated surface sea water and cold water from great depths, a chamber located a substantial distance above a body of such surface water, means for withdrawing air from such chamber to reduce the pressure therein, an inlet pipe leading up to such chamber from below the surface of the body of water, in which water will rise with a gradual reduction in pressure until the pressure is substantially below atmospheric, a series of traps for catching air released from such water as the pressure progressively drops below atmospheric and means for removing such entrapped air.

9. A vaporizing chamber, means for bringing relatively hot sea surface water into such chamber, a condensing chamber, means for introducing relatively cold sea water from great depths into the condensing chamber, means for exhausting air from one of said chambers, and a drain pipe leading down from each of said chambers a substantial distance, said pipes having their lower ends in a body of water adapted to seal such ends against the entrance of air, whereby the weight of the columns of exhaust water in such drain pipes will assist in maintaining low pressures in such chambers.

10. A process of obtaining power from the difference in temperature between naturally heated surface sea water and cold water from great depths, which comprises forcing upwardly with the aid of atmospheric pressure the naturally heated water from a mass of water open to the air, maintaining a pressure below the boiling pressure of such water adjacent the upper surface thereof whereby a portion of such water is vaporized and the temperature of the balance of such water is lowered, withdrawing unvaporized water by the aid of gravity working against atmospheric pressure so that the unvaporized water is returned to atmospheric pressure and withdrawing the vapor generated by the condensing action of cold sea water from great depths.

11. An apparatus for obtaining power from the difference in temperature between naturally heated surface sea water and cold water from great depths, which comprises a delivery tube of substantial height, the lower end of which is submerged in warm sea water, means for causing water to flow upwardly in such tube and enter a chamber in which the pressure is maintained low enough to cause the water to boil, means for breaking up the water in such chamber to give an extended surface to cause a portion of such water to be vaporized, a return tube having its lower end submerged in water at atmospheric pressure and means for withdrawing water vapor from such chamber such latter means comprising a condenser adapted to be operated by relatively cold water and means for supplying cold water from great depths of the sea to such condenser.

12. An apparatus as specified in claim 11 which further includes means for causing the water to flow downwardly during a portion of its passage through such delivery tube, whereby release of air is accelerated, means for entrapping and withdrawing air after such downward flow and means for causing the water thereafter to flow to a level above the surface of the water which is under such entrapped air.

GEORGES CLAUDE.
PAUL BOUCHEROT.